United States Patent [19]

Quattromani et al.

[11] Patent Number: 5,596,740
[45] Date of Patent: Jan. 21, 1997

[54] INTERLEAVED MEMORY CONFLICT RESOLUTION WITH ACCESSES OF VARIABLE BANK WIDTHS AND PARTIAL RETURN OF NON-CONFLICTING BANKS

[75] Inventors: Marc A. Quattromani, Allen; John K. Eitrheim, Plano, both of Tex.

[73] Assignee: Cyrix Corporation, Richardson, Tex.

[21] Appl. No.: 378,330

[22] Filed: Jan. 26, 1995

[51] Int. Cl.[6] .......................... G06F 12/00; G06F 13/00
[52] U.S. Cl. ........................ 395/484; 364/DIG. 1; 364/DIG. 2; 365/189.02; 365/230.02; 365/230.03; 395/454
[58] Field of Search ..................... 395/405, 445, 395/454, 458, 476, 477, 478, 484, 485, 729; 364/DIG. 1, DIG. 2; 365/189.02, 230.02, 230.03

[56] References Cited

U.S. PATENT DOCUMENTS

| | | | |
|---|---|---|---|
| 4,600,992 | 7/1986 | Boudreau | 395/729 |
| 4,652,993 | 3/1987 | Scheuneuar et al. | 395/478 |
| 4,745,545 | 5/1988 | Schiffleger | 395/477 |
| 4,766,535 | 8/1988 | Auerbach et al. | 395/492 |
| 4,818,932 | 4/1989 | Odenheimer | 324/121 R |
| 4,833,599 | 5/1989 | Colwell et al. | |
| 4,914,575 | 4/1990 | Kihara et al. | 395/484 |
| 4,933,646 | 6/1990 | Humphrey et al. | |
| 5,043,874 | 8/1991 | Gagliardo et al. | |
| 5,142,638 | 8/1992 | Schiffleger | 395/478 |
| 5,168,547 | 12/1992 | Miller et al. | |
| 5,179,680 | 1/1993 | Colwell et al. | |
| 5,202,970 | 4/1993 | Schiffleger | 395/478 |
| 5,269,010 | 12/1993 | Macdonald | 395/484 |
| 5,367,654 | 11/1994 | Furukawa et al. | 395/485 |
| 5,412,788 | 5/1995 | Collins et al. | 395/484 |

FOREIGN PATENT DOCUMENTS

WO93/13481  7/1993  WIPO.

Primary Examiner—Tod R. Swann
Assistant Examiner—Tuan V. Thai
Attorney, Agent, or Firm—Andrew S. Viger; John L. Maxin

[57] ABSTRACT

A shared interleaved memory having a relatively large number of banks employs circuitry and methodology for resolving bank conflicts without significantly inducing delay into the data path. A first and a second port make data read, data write, and instruction fetch requests to/from the shared interleaved memory by way of asserting a priority signal, an address, and an operand size which are decoded to discern which, if any, memory banks in the interleaved shared memory are needed. In the event of a bank request conflict, the highest priority requester gets all its requested banks and the losing requester gets all nonconflicting requested banks. After the banks in the interleaved memory are allocated, a signal identifying that the losing requester did not receive all its requested banks is generated which does not impact the delay in the data path and accordingly, the losing requester resubmits its request on the next cycle.

4 Claims, 6 Drawing Sheets

INTERLEAVED MEMORY CONFLICT RESOLUTION WITH ACCESSES OF VARIABLE BANK WIDTHS AND PARTIAL RETURN OF NON-CONFLICTING BANKS

BACKGROUND OF THE INVENTION

1. Field of the Invention

The invention relates generally to computer systems, and more particularly to resolving bank conflicts in a shared interleaved memory.

2. Description of Related Art

Without limiting the scope of the invention, this background information is provided in the context of a specific problem to which the invention has application.

Shared memory organization principally takes on two forms namely; multiple (dual) ported or interleaved single ported. It is well known that dual ported memory devices carry with it an overhead in the form of increased size, cost, and power consumption in exchange for a slight performance increase over single ported interleaved memory. On the other hand, interleaved memory organization while preferable from a size, cost, and power consumption standpoint, typically requires elaborate bank conflict resolution circuitry—complicating speed path issues in the data and control paths.

By way of background, a typical shared interleaved memory is organized with "M" memory banks, each bank having a width of "W" bytes. The values for M and W are based for the most part, on the data bus width, the nominal length of the operand data stored therein, and as discussed hereinbelow, complexity of bank conflict resolution logic. For example in a variable length instruction machine, an instruction cache memory should preferably have a minimum bank width W equal to the length of its smallest instruction. Thus, operand fetches from the instruction cache would be efficient since the minimum "slice" would equal the smallest length instruction, however in some cases, an operand fetch would require access to two or more memory banks. On the other hand, if the bank width were made bigger, less efficient operation would occur since larger chunks of operands would be fetched even if all were not needed. Accordingly, it can be seen that the more numerous and the narrower the memory banks, the more plentiful and granular the selection, and consequently, the less likelihood of a conflict between multiple independent accesses.

An example of multiple independent accesses in a scalar processor would be concurrent data and instruction accesses (data read, instruction fetch, or data write) to a unified cache. In a superscalar processor, an example of multiple independent accesses could be two or more contemporaneous independent data reads to the unified cache.

One disadvantage of employing a large number of narrow banks in a shared interleaved memory is that it complicates the bank conflict resolution circuitry. Specifically, the bank conflict resolution circuitry must take into account not only the addresses and the address size sought by multiple accesses, but also the size of the operand (byte, word, double-word, etc.) in determining which and what number of banks are required for the memory access.

More importantly however, the bank conflict resolution circuitry can significantly induce delay into the data path and skew the control and data paths. More specifically, in resolving bank conflicts and determining priority, prior art approaches have typically generated some sort of "overlap" signal by comparing each and every bank request from each and every independent requester and logically ORing the results of each comparison to form a single overlap signal. If there is an overlap, the overlap signal is used by prioritizing logic to exclusively grant all banks to the highest priority requester and to inhibit the lower priority requester(s).

By way of further background, it is well accepted practice that a standard "single gate delay" logic circuit typically can only accept three to five inputs while maintaining safe operating parameters. Accordingly, if it is necessary to compare contention among many banks in a multiple banked interleaved memory, the requisite logic necessary to generate the overlap signal will have multiple levels of gates adding delay to the data path. It can be seen for example, that if the memory is interleaved into sixteen banks, the logical ORing which forms the single overlap signal would induce at least two gate delays into the data path. In the past, in order to avoid significant data path delays, tradeoffs were made to limit the number of banks thus increasing the width of each bank—decreasing the resolution, and increasing the probability of a conflict between two independent accesses.

From the foregoing, it can be seen that there is a need for a shared interleaved memory system having a relatively large number of banks and associated conflict resolution circuitry without inducing significant delay into the data path.

SUMMARY OF THE INVENTION

To overcome the limitations in the prior art described above, and to overcome other limitations that will become apparent upon reading and understanding the present specification, the present invention discloses a shared interleaved memory having a relatively large number of banks which employs circuitry and methodology for resolving bank conflicts without significantly inducing delay into the data path. A first and a second port makes data read, data write, and instruction fetch requests to/from the shared interleaved memory by way of asserting a priority signal an address, and an operand size which are decoded to discern which, if any, memory banks in the interleaved shared memory are needed. In the event of a bank request conflict, the highest priority requester gets all its requested banks and the losing requester gets all non-conflicting requested banks. After the banks in the interleaved memory are allocated, a signal identifying that the losing requester did not receive all its requested banks is generated which does not impact the delay in the data path and accordingly, the losing requester resubmits its request on the next cycle.

A feature of the present invention is that interleaved shared memory can be parsed into many banks without significantly impacting the delay in the data path.

Another feature of the present invention is that the bank conflict resolution logic resides in the control path thus more evenly balancing the delay between the control and data paths.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described specific examples of systems and methods in accordance with the present invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 1b illustrates a generalized block diagram of the instruction pipeline stages for the exemplary microprocessor in FIG. 1a;

FIG. 2 illustrates a block diagram of a processor system using the exemplary microprocessor depicted in FIG. 1a;

FIG. 4 illustrates a shared interleaved memory system practiced in accordance with the principles of the present invention, preferably employed as a unified cache in the exemplary microprocessor of FIG. 1a;

DETAILED DESCRIPTION OF THE PREFERRED EMBODIMENT

The detailed description of an exemplary embodiment of the microprocessor of the present invention is organized as follows:

1. Exemplary Processor System
    1.1. Microprocessor.
    1.2. System
2. Generalized Pipeline Architecture
3. Shared Interleaved Cache Memory
    3.1 Bank Conflict Resolution
4. Conclusion This organizational table, and the corresponding headings used in this detailed description, are provided for the convenience of reference only. Detailed description of conventional or known aspects of the microprocessor are omitted as to not obscure the description of the invention with unnecessary detail. It should be understood that while the present invention is described in the context of a unified cache embodied in the exemplary microprocessor of FIG. 1a, it has general application to any shared interleaved memory.

1. Exemplary Processor System.

Figure 1A:
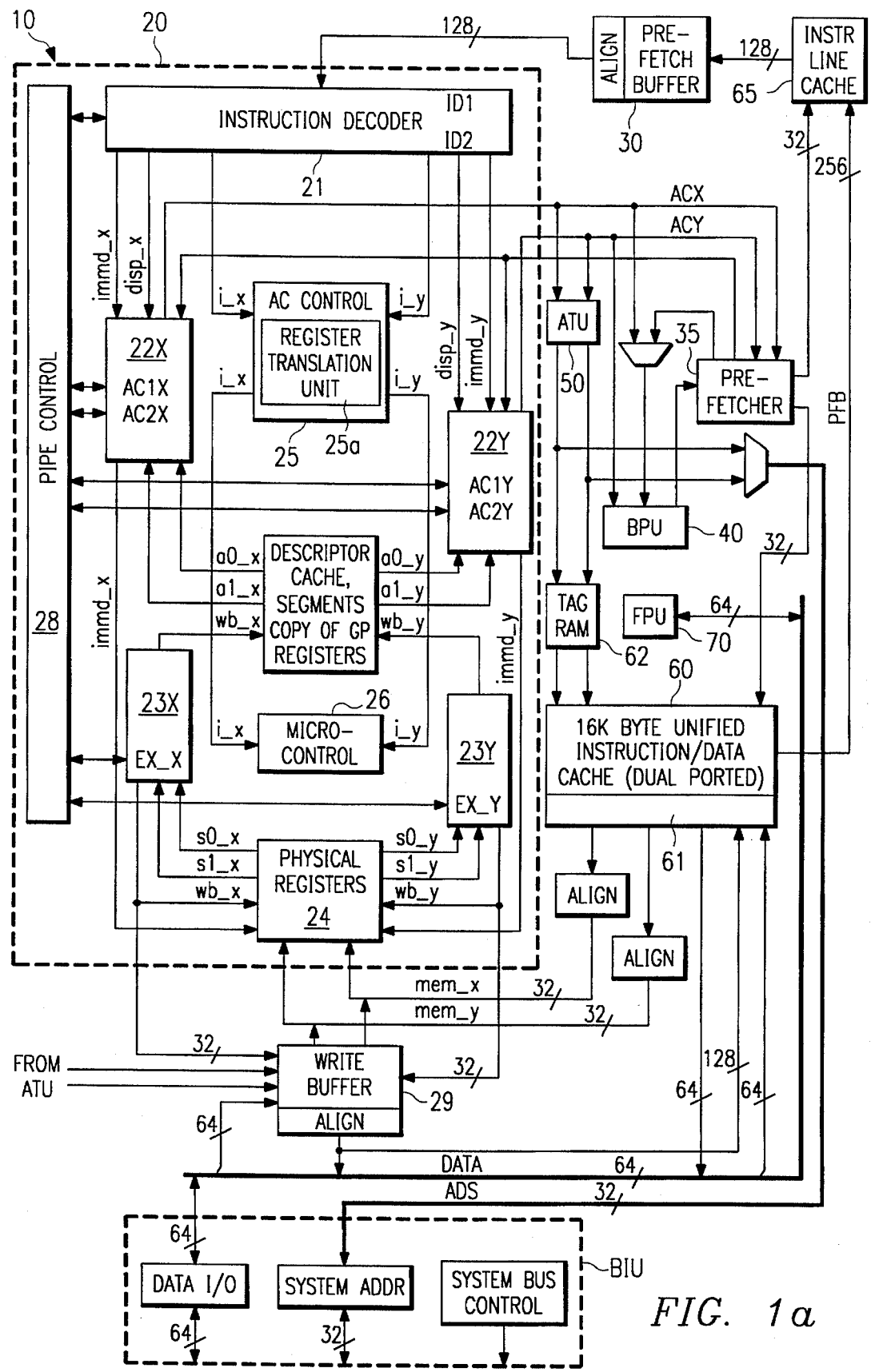
FIG. 1a illustrates a block diagram of an exemplary microprocessor practiced in accordance with the principles of the present invention.
Figure 1B:
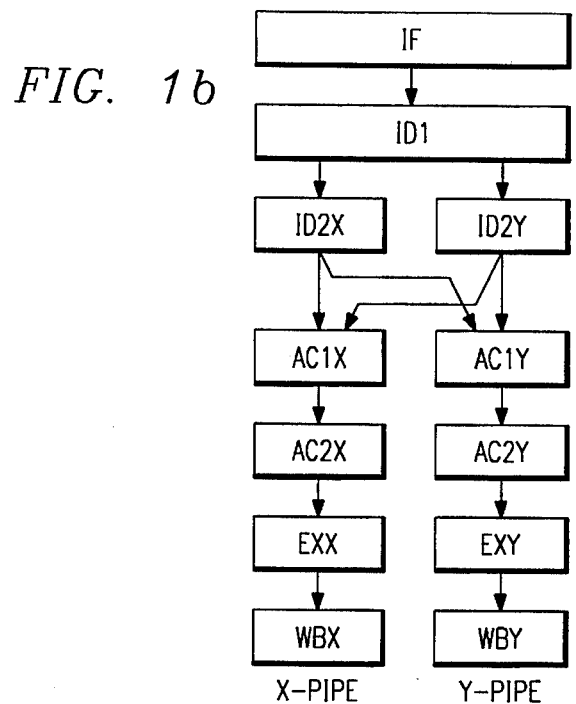
Figure 2:
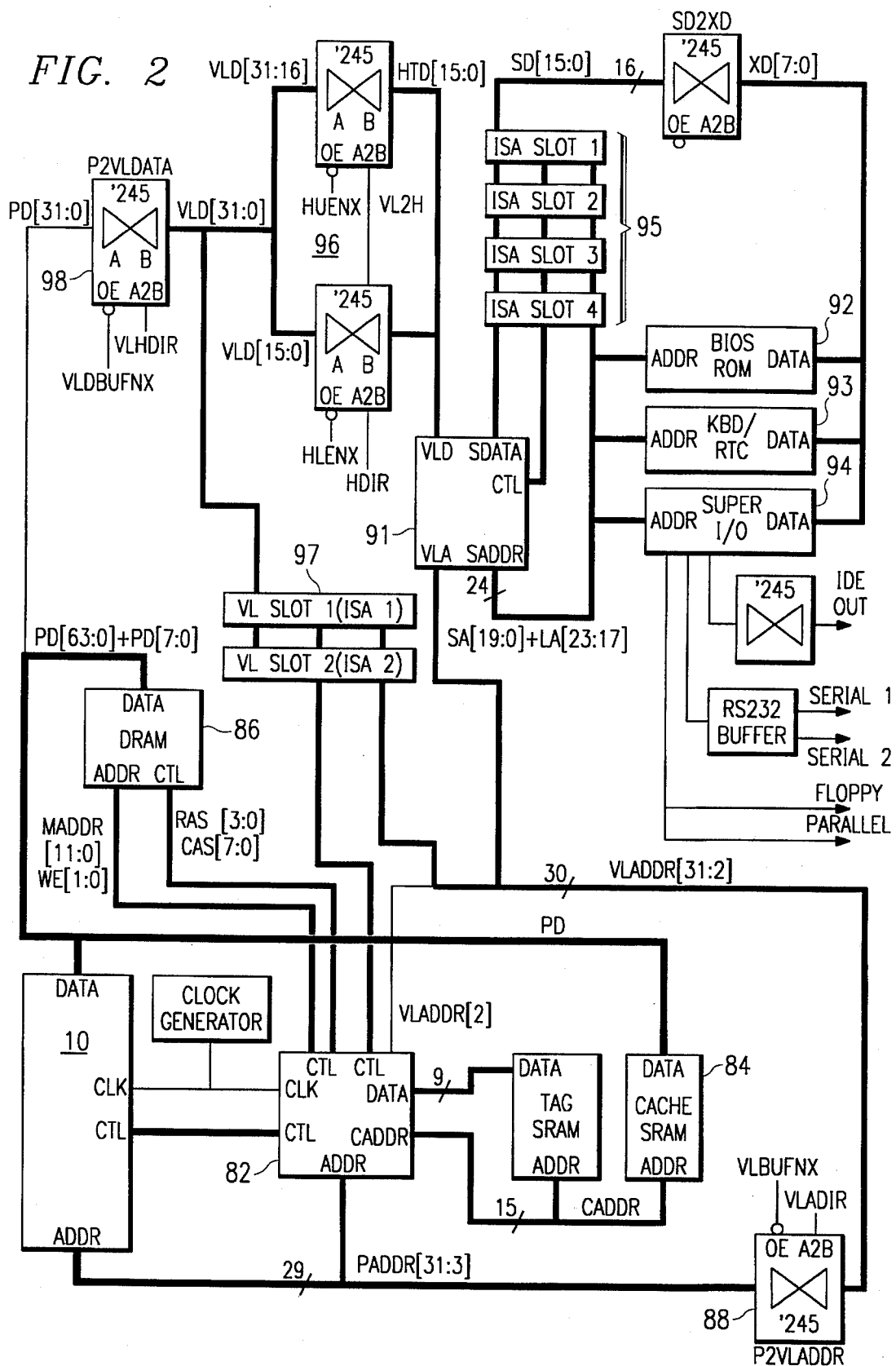

The exemplary processor system is shown in FIGS. 1a, 1b, and FIG. 2. FIGS. 1a and 1b respectively illustrate the basic functional blocks of the exemplary superscalar, super-pipelined microprocessor along with the pipe stages of the two execution pipelines. FIG. 2 illustrates an exemplary processor system (motherboard) design using the microprocessor.

1.1. Microprocessor.

Referring to FIG. 1a, the major sub-blocks of a microprocessor 10 include: (a) central processing unit (CPU) core 20, (b) prefetch buffer 30, (c) prefetcher 35, (d) branch processing unit (BPU) 40, (e) address translation unit (ATU) 50, and (f) unified 16 Kbyte code/data cache 60, including TAG RAM 62. A 256 byte instruction line cache 65 provides a primary instruction cache to reduce instruction fetches to the unified cache 60, which operates as a secondary instruction cache. An onboard floating point unit (FPU) 70 executes floating point instructions issued to it by the CPU core 20.

The microprocessor uses internal 32-bit address and 64-bit data buses ADS and DATA, respectively. A 256 bit (32 byte) prefetch bus (PFB), corresponding to the 32 byte line size of the unified cache 60 and the instruction line cache 65, allows a full line of 32 instruction bytes to be transferred to the instruction line cache in a single clock. Interface to external 32 bit address and 64 bit data buses is through a bus interface unit (BIU).

The CPU core 20 is a superscalar design with two execution pipes X and Y. It includes an instruction decoder 21, address calculation units 22X and 22Y, execution units 23X and 23Y, and a register file 24 with 32 32-bit registers. An AC control unit 25 includes a register translation unit 25a with a register scoreboard and register renaming hardware. A microcontrol unit 26, including a microsequencer and microROM, provides execution control.

Writes from CPU core 20 are queued into twelve 32 bit write buffers 29—write buffer allocation is performed by the AC control unit 25. These write buffers provide an interface for writes to the unified cache 60—non-cacheable writes go directly from the write buffers to external memory. The write buffer logic supports optional read sourcing and write gathering.

A pipe control unit 28 controls instruction flow through the execution pipes, including: keeping the instructions in order until it is determined that an instruction will not cause an exception; squashing bubbles in the instruction stream; and flushing the execution pipes behind branches that are mispredicted and instructions that cause an exception. For each stage, the pipe control unit keeps track of which execution pipe contains the earliest instruction, provides a "stall" output, and receives a "delay" input.

BPU 40 predicts the direction of branches (taken or not taken), and provides target addresses for predicted taken branches and unconditional change of flow instructions (jumps, calls, returns). In addition, it monitors speculative execution in the case of branches and floating point instructions, i.e., the execution of instructions speculatively issued after branches which may turn out to be mispredicted, and floating point instructions issued to the FPU which may fault after the speculatively issued instructions have completed execution. If a floating point instruction faults, or if a branch is mispredicted (which will not be known until the EX or WB stage for the branch), then the execution pipeline must be repaired to the point of the faulting or mispredicted instruction (i.e., the execution pipeline is flushed behind that instruction), and instruction fetch restarted.

Pipeline repair is accomplished by creating checkpoints of the processor state at each pipe stage as a floating point or predicted branch instruction enters that stage. For these checkpointed instructions, all resources (programmer visible registers, instruction pointer, condition code register) that can be modified by succeeding speculatively issued instructions are checkpointed. If a checkpointed floating point instruction faults or a checkpointed branch is mispredicted, the execution pipeline is flushed behind the checkpointed instruction—for floating point instructions, this will typically mean flushing the entire execution pipeline, while for a mispredicted branch there may be a paired instruction in EX and two instructions in WB that would be allowed to complete.

For the exemplary microprocessor 10, the principle constraints on the degree of speculation are: (a) speculative execution is allowed for only up to four floating point or branch instructions at a time (i.e., the speculation level is maximum 4), and (b) a write or floating point store will not complete to the cache or external memory until the associated branch or floating point instruction has been resolved (i.e., the prediction is correct, or floating point instruction does not fault).

The unified cache 60 is 4-way set associative (with a 4 k set size), using a pseudo-LRU replacement algorithm, with write-through and write-back modes. It is dual ported (through banking as described in more detail hereinbelow) to permit two memory accesses (data read, instruction fetch, or data write) per clock. The instruction line cache 65 is a fully associative, lookaside implementation (relative to the unified cache 60), using an LRU replacement algorithm.

The FPU 70 includes a load/store stage with 4-deep load and store queues, a conversion stage (32-bit to 80-bit extended format), and an execution stage. Loads are controlled by the CPU core 20, and cacheable stores are directed through the write buffers 29 (i.e., a write buffer is allocated for each floating point store operation).

Referring to FIG. 1b, the microprocessor has seven-stage X and Y execution pipelines: instruction fetch (IF), two instruction decode stages (ID1, ID2), two address calculation stages (AC1, AC2), execution (EX), and write-back (WB). Note that the complex ID and AC pipe stages are superpipelined.

The IF stage provides a continuous code stream into the CPU core 20. The prefetcher 35 fetches 16 bytes of instruction data into the prefetch buffer 30 from either the (primary) instruction line cache 65 or the (secondary) unified cache 60. BPU 40 is accessed with the prefetch address, and supplies target addresses to the prefetcher for predicted changes of flow, allowing the prefetcher to shift to a new code stream in one clock.

The decode stages ID1 and ID2 decode the variable length X86 instruction set. The instruction decoder 21 retrieves 16 bytes of instruction data from the prefetch buffer 30 each clock. In ID1, the length of two instructions is decoded (one each for the X and Y execution pipes) to obtain the X and Y instruction pointers—a corresponding X and Y bytes-used signal is sent back to the prefetch buffer (which then increments for the next 16 byte transfer). Also in ID1, certain instruction types are determined, such as changes of flow, and immediate and/or displacement operands are separated. The ID2 stage completes decoding the X and Y instructions, generating entry points for the microROM and decoding addressing modes and register fields.

During the ID stages, the optimum pipe for executing an instruction is determined, and the instruction is issued into that pipe. Pipe switching allows instructions to be switched from ID2X to AC1Y, and from ID2Y to AC1X. For the exemplary embodiment, certain instructions are issued only into the X pipeline: change of flow instructions, floating point instructions, and exclusive instructions. Exclusive instructions include: any instruction that may fault in the EX pipe stage and certain types of instructions such as protected mode segment loads, string instructions, special register access (control, debug, test), Multiply/Divide, Input/Output, Push All/Pop All (PUSH/POPA), and task switch. Exclusive instructions are able to use the resources of both pipes because they are issued alone from the ID stage (i.e., they are not paired with any other instruction). Except for these issue constraints, any instructions can be paired and issued into either the X or Y pipe.

The address calculation stages AC1 and AC2 calculate addresses for memory references and supply memory operands. The AC1 stage calculates two 32 bit linear (three operand) addresses per clock (four operand addresses, which are relatively infrequent, take two clocks). Data dependencies are also checked and resolved using the register translation unit 25a (register scoreboard and register renaming hardware)—the 32 physical registers 24 are used to map the 8 general purpose programmer visible logical registers defined in the X86 architecture (EAX, EBX, ECX, EDX, EDI, ESI, EBP, ESP).

The AC unit includes eight architectural (logical) registers (representing the x86 defined register set) that are used by the AC unit to avoid the delay required to access in AC1 the register translation unit before accessing register operands for address calculation. For instructions that require address calculations, AC1 waits until the required data in the architectural registers is valid (no read after write dependencies) before accessing those registers. During the AC2 stage, the register file 24 and the unified cache 60 are accessed with the physical address (for cache hits, cache access time for the dual ported unified cache 60 is the same as that of a register, effectively extending the register set)—the physical address is either the linear address, or if address translation is enabled, a translated address generated by the ATU 50.

Translated addresses are generated by the ATU 50 from the linear address using information from page tables in memory and workspace control registers on chip. The unified cache 60 is virtually indexed and physically tagged to permit, when address translation is enabled, set selection with the untranslated address (available at the end of AC1) and, for each set, tag comparison with the translated address from the ATU 50 (available early in AC2). Checks for any segmentation and/or address translation violations are also performed in AC2.

Instructions are kept in program order until it is determined that they will not cause an exception. For most instructions, this determination is made during or before AC2—floating point instructions and certain exclusive instructions may cause exceptions during execution. Instructions are passed in order from AC2 to EX (or in the case of floating point instructions, to the FPU)—because integer instructions that may still cause an exception in EX are designated exclusive, and therefore are issued alone into both execution pipes, handling exceptions in order is ensured.

The execution stages EXX and EXY perform the operations defined by the instruction. Instructions spend a variable number of clocks in EX, i.e., they are allowed to execute out of order (out of order completion). Both EX stages include adder, logical and shifter functional units, and in addition, the EX_X stage 23X contains multiply/divide hardware. The WB stage updates the register file 24, condition codes, and other parts of the machine state with the results of the previously executed instruction. The register file is written in Phase 1 (PH1) of WB and read in Phase 2 (PH2) of AC2.

1.2. System.

Referring to FIG. 2, for the exemplary embodiment, microprocessor 10 is used in a processor system that includes a single chip memory and bus controller 82. The memory/bus controller 82 provides the interface between the microprocessor and the external memory subsystem—level two cache 84 and main memory 86—controlling data movement over the 64 bit processor data bus PD (the data path is external to the controller which reduces its pin count and cost).

Controller 82 interfaces directly to the 32-bit address bus PADDR, and includes a one bit wide data port (not shown)

for reading and writing registers within the controller. A bi-directional isolation buffer 88 provides an address interface between microprocessor 10 and VL and ISA buses.

Controller 82 provides control for the VL and ISA bus interface. A VL/ISA interface chip 91 (such as an HT321) provides standard interfaces to a 32 bit VL bus and a 16 bit ISA bus. The ISA bus interfaces to BIOS 92, keyboard controller 93, and I/O chip 94, as well as standard ISA slots 95. The interface chip 91 interfaces to the 32 bit VL bus through a bi-directional 32/16 multiplexer 96 formed by dual high/low word [31:16]/[15:0] isolation buffers. The VL bus interfaces to standard VL slots 97, and through a bi-directional isolation buffer 98 to the low double word [31:0] of the 64 bit processor data (PD) bus.

2. Generalized Pipeline Architecture.

Figure 3:
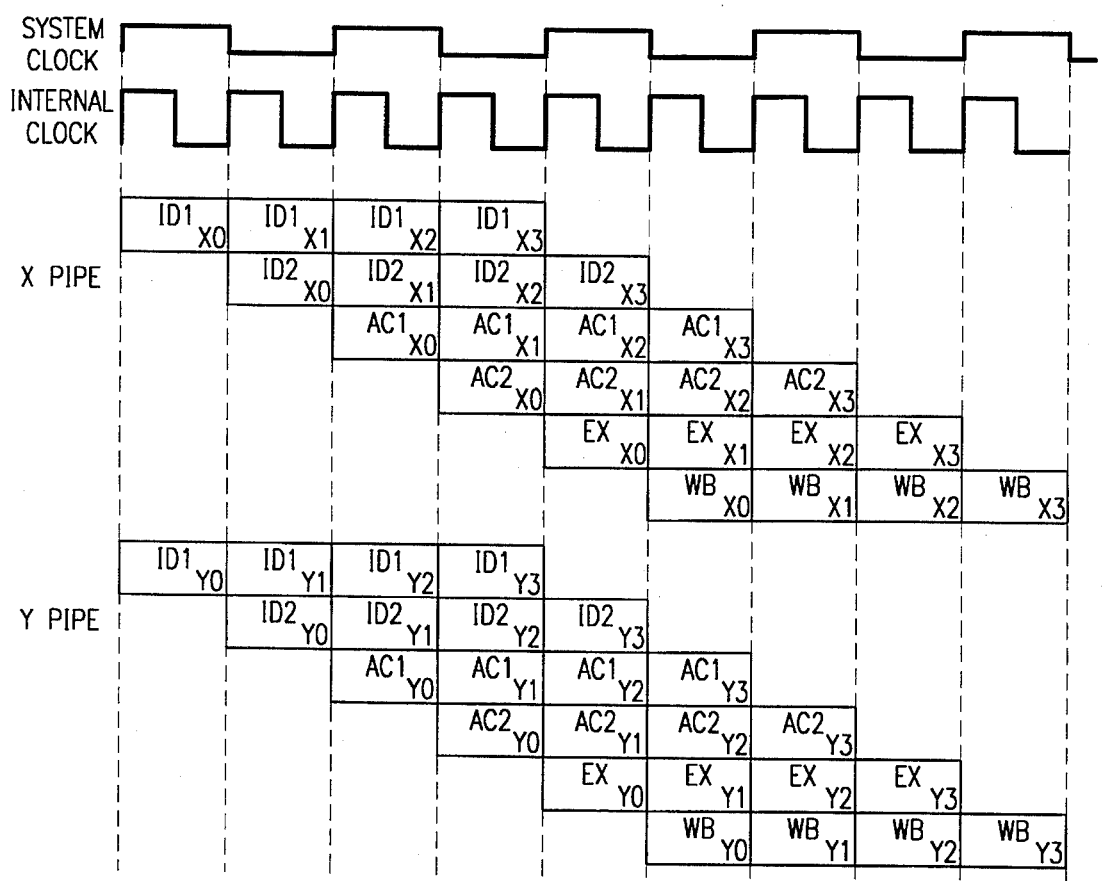
FIG. 3 illustrates a timing diagram showing the flow of instructions through the pipeline stages.

FIG. 3 illustrates the flow of four instructions per pipeline, showing the overlapping execution of the instructions, for a two pipeline architecture. Additional pipelines and additional stages for each pipeline could also be provided. In the preferred embodiment, the microprocessor 10 uses an internal clock 122 which is a multiple of the system clock 124. In FIG. 3, the internal clock is shown as operating at two times the frequency of the system clock. During the first internal clock cycle 126, the ID1 stage operates on respective instructions X0 and Y0. During internal clock cycle 128, instructions X0 and Y0 are in the ID2 stage (X0 being in ID2x and Y0 being in ID2y) and instructions X1 and Y1 are in the ID1 stage. During internal clock cycle 130, instructions X2 and Y2 are in the ID1 stage, instructions X1 and Y1 are in the ID2 stage (X1 being in ID2x and Y1 being in ID2y) and instructions X0 and Y0 are in the AC1 stage (X0 being in AC1x and Y0 being in AC1y). During internal clock cycle 132, instructions X3 and Y3 are in the ID1 stage, instructions X2 and Y2 are in the ID2 stage, instructions X1 and Y1 are in the AC1 stage and instructions X0 and Y0 are in the AC2 stage. The instructions continue to flow sequentially through the stages of the X and Y pipelines. As shown in clocks 134-140, the execution portion of each instruction is performed on sequential clock cycles. This is a major advantage of a pipelined architecture—the number of instructions completed per clock is increased, without reducing the execution time of an individual instruction. Consequently a greater instruction throughput is achieved with greater demands on the speed of the hardware.

The instruction flow shown in FIG. 3 is the optimum case. As shown, each pipe stage completes on time and no stage requires more than one clock cycle. In an actual machine, however, one or more stages may require additional clock cycles to complete thereby changing the flow of instructions through the other pipe stages. Furthermore, the flow of instructions through one pipeline may be dependent upon the flow of instructions through the other pipeline.

A number of factors may cause delays in various stages of one or all of the pipelines. For example, an access to memory may miss in the memory cache, thereby preventing access of the data in the time required to process the instruction in one clock. This would require that either, or both, sides of the AC1 stage to delay until the data was retrieved from main memory. For a particular stage, other stages of the pipeline may be using a needed resource, such as a multiplier, which is only in one of the execution stages in the illustrated embodiment. In this case, the stage must delay until the resource is available. Data dependencies can also cause delays. If an instruction needs the result from a previous instruction, such as an ADD, it must wait until that instruction is processed by the execution unit.

Other delays are caused by "multi-box" instructions; i.e., instructions which are implemented using multiple microinstructions, and therefore require more than one clock cycle to complete. These instructions stop the flow of subsequent instructions through the pipeline at the output of the ID2 stage.

The flow of instructions through the pipeline is controlled by the pipe control unit 28. In the preferred embodiment, a single pipe control unit 28 is used to control the flow of instructions through both (or all) of the pipes. To control the flow of instructions through the pipes, the pipe control unit 28 receives "delay" signals from the various units comprising the pipelines 102 and 104, and issues "stall" signals to the various units.

Although a single pipe control unit 28 is used for both X and Y pipelines, the pipelines themselves are controlled independent of one another. In other words, a stall in the X pipeline does not necessarily cause a stall in the Y pipeline.

3. Shared Interleaved Cache Memory

Figure 4:
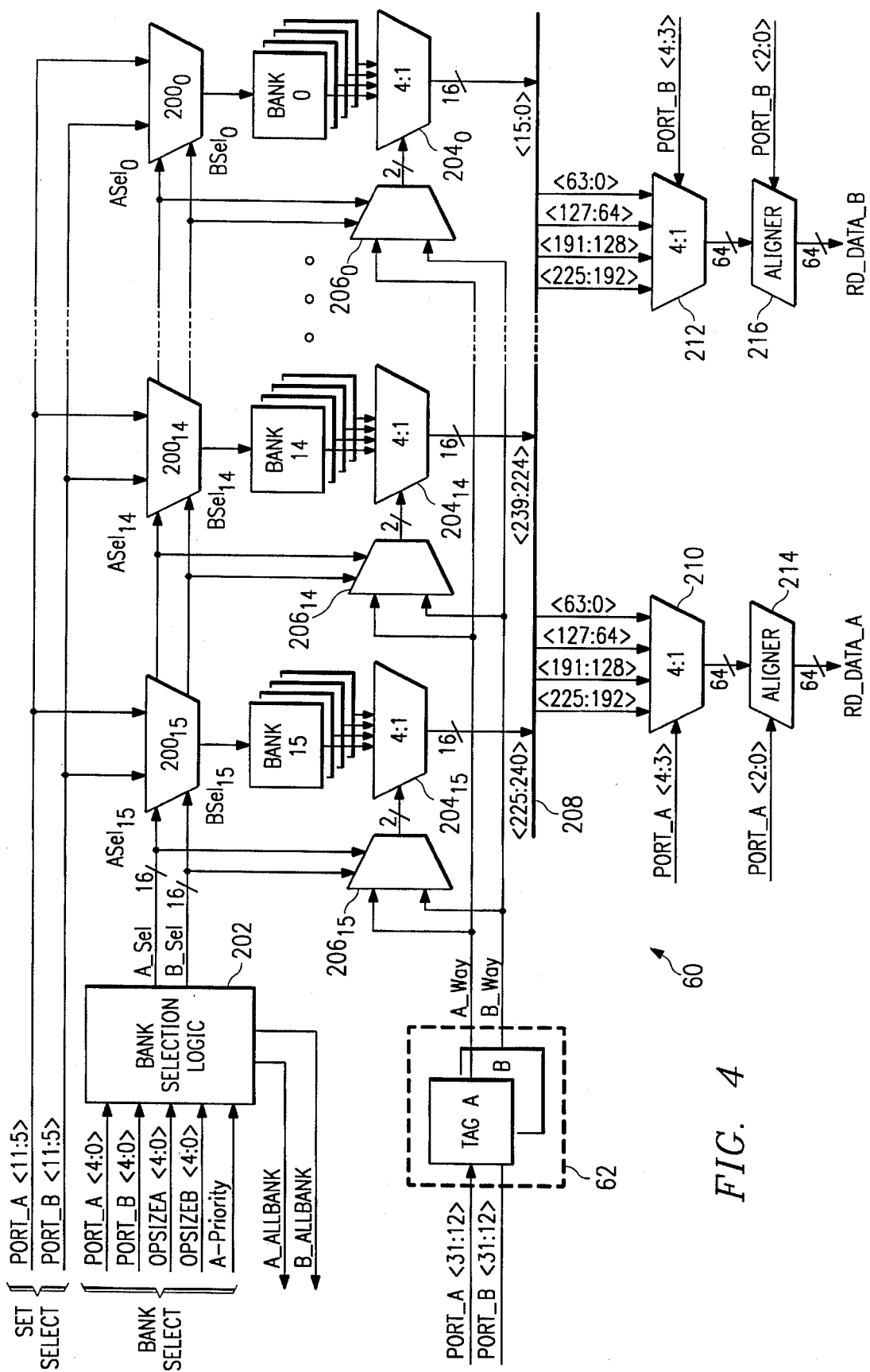

Reference is now made to FIG. 4 which depicts an exemplary, but not exclusive, embodiment of a shared interleaved memory employing the bank conflict resolution circuitry and methodology of the present invention. It should be understood that while the present invention is described in the context of the unified cache 60 for the exemplary microprocessor described above and depicted in FIG. 1a, those skilled in the art will recognize with the aid of the present disclosure, other shared interleaved memory systems and applications without departing from the scope of the present invention. It should also be understood that while the present invention is described with respect to multiple independent data reads, it also applies to multiple independent data writes and multiple independent instruction fetches.

The unified cache 60 comprises a plurality of memory banks (e.g. $Bank_{15}$-$Bank_0$). In the preferred embodiment, the unified cache 60 is organized as four-way set associative. It should be understood however, that the unified cache 60 could be organized anywhere between direct mapped through fully associative without departing from the scope of the present invention. $Bank_{15}$-$Bank_0$ have associated "Way Select" tags stored in Tag RAM 62 selectable by address inputs <31:12> from either Port_A and Port_B. Port_A and Port_B can originate from either address calculation unit 22X or 22Y. Each $Bank_{15}$-$Bank_0$ receives "Set Select" address bits <11:5> from mutiplexers $200_{15}$-$200_0$, respectively. Mutiplexers $200_{15}$-$200_0$ receive first and second Set Select address inputs <11:5> from Port_A and Port_B. Mutiplexers $200_{15}$-$200_0$ respectively receive control inputs $ASel_{15}$_$BSel_{15}$- $ASel_0$_$BSel_0$ from bank selection logic 202, described in more detail herein below. The four-way outputs from $Bank_{15}$-$Bank_0$ are coupled into four-to-one multiplexers $204_{15}$-$204_0$ which select one-of-four words. Multiplexers $204_{15}$-$204_0$ are controlled by the output of "Way Select" multiplexers $206_{15}$-$206_0$ which receive inputs from Tag RAM 62 and which are controlled by Bank selection logic 202.

The collective outputs of multiplexers $204_{15}$-$204_0$ form a two-hundred-fifty-six bit data bus 208. Data bus 208 is coupled into a first four-to-one concentrator 210 for Port_A and a second four-to-one concentrator 212 for Port_B which concatenate selected four-16 bit words together to form a 64-bit data bus. Concentrators 210 and 212 are respectively controlled by address bits <4:3> from Port_A and Port_B. The outputs of concentrators 210 and 212 are respectively coupled to Aligners 214 and 216. Aligners 214 and 216 are respectively controlled by address bits <2:0> from Port_A and Port_B. The outputs of Aligners 214 and 216 provide a sixty-four bit Dword aligned in accordance with address bits <2:0>. In the preferred embodiment however, the Aligners 214 and 216 are adapted to provide the Y pipe stage with a 32-bit data path and the X pipe stage with a 64-bit data path.

3.1 Bank Conflict Resolution

Figure 5:
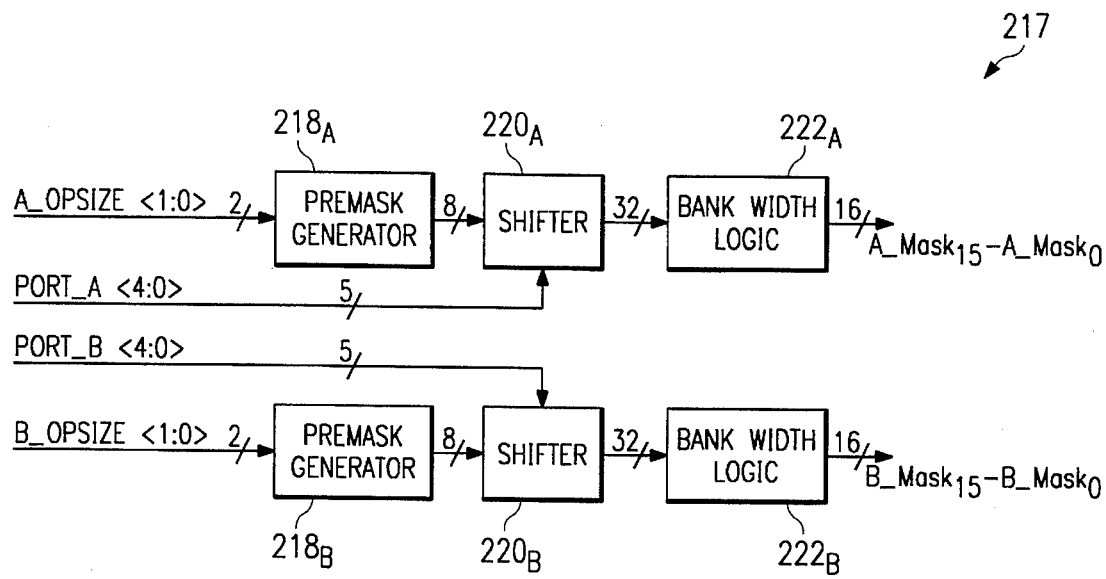
FIG. 5 illustrates the preferred embodiment for mask generation circuitry embodied in the bank selection logic of FIG. 4.

Reference is now made to FIG. 5 which illustrates the preferred embodiment for mask generation circuitry 217 embodied in the bank selection logic 202 depicted in FIG. 4. It should be understood that bank selection logic 202 is substantially symmetrical for Port_A and Port_B and therefore, like functional modules are referenced identically with the exception of subscripts A and B. Accordingly, the following description only describes those functional modules for Port_A and points out the differences with respect to Port_B.

Premask generator $218_A$ receives a two-bit operand size code associated with the address on Port_A from address calculation unit 22X (FIG. 1a). In response, premask generator $218_A$ generates an eight-bit "Premask" in accordance with Truth Table 1. It should be understood that the operand size code and the Premask can be modified to accommodate other operand sizes without departing from the scope of the present invention.

TABLE 1

| Operand Size | Premask |
| --- | --- |
| Byte 00 | 0000 0001 |
| Word 01 | 0000 0011 |
| Dword 10 | 0000 1111 |
| Qword 11 | 1111 1111 |

The eight bit Premask output from premask generator $218_A$ is coupled into shifter $220_A$. Shifter $220_A$ also receives five address bits Port_A <4:0> which specifies how many (zero-to-thirty one) places that shifter $220_A$ should shift. In the preferred embodiment, shifter $220_A$ shifts the eight premask bits left an amount specified by address bits <4:0> to form a thirty-two bit "Byte Mask". The thirty-two bit Byte Mask is coupled to bank width logic $222_A$ which logically OR's adjacent bits to form a sixteen bit "Bank Mask" (A_Mask$_{15}$-A_Mask$_0$). Sixteen bit Bank Mask (A_Mask$_{15}$-A_Mask$_0$) represents the required memory banks in the unified cache 60 to fulfill the address request of Port_A. At this point it should be noted that due to the variable length of instructions in a complex instruction set computer (CISC) of the preferred embodiment, an operand fetch can cross cache lines. Accordingly in such a case, first and second Bank Masks are required to cover both cache lines.

Figure 6:
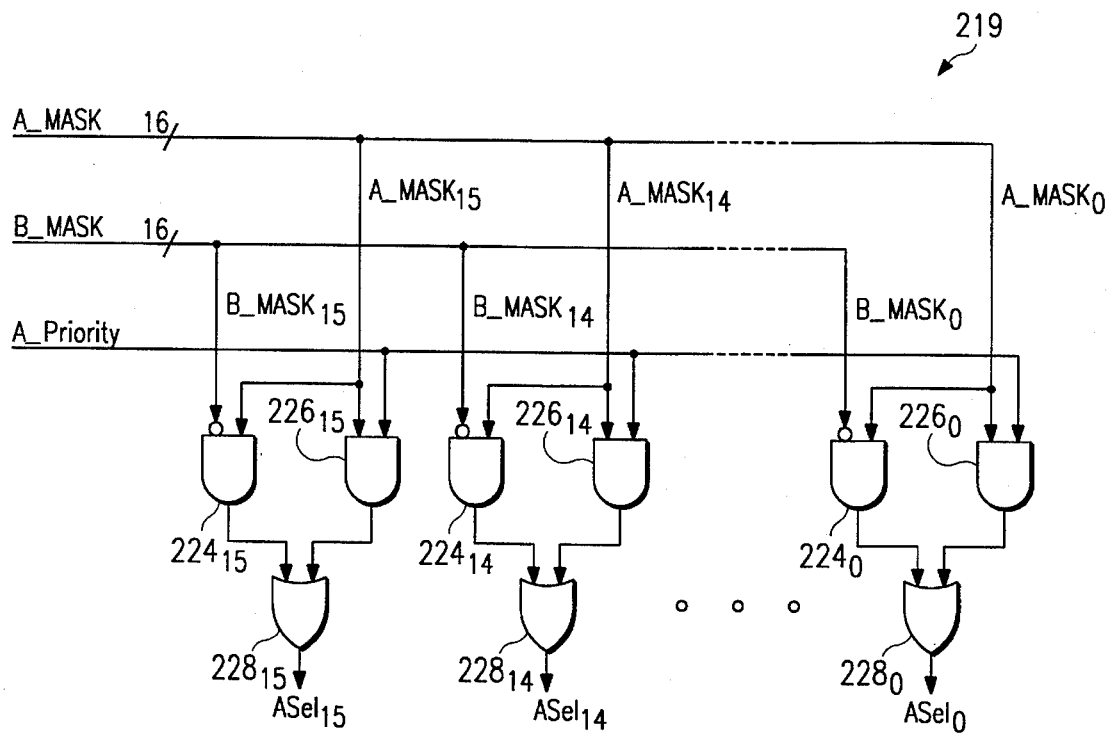
FIG. 6 illustrates the preferred embodiment for selection circuitry embodied in the bank selection logic of FIG. 4.

Reference is now made to FIG. 6 which illustrates the preferred embodiment for selection circuitry 219 embodied in the bank selection logic 202 depicted in FIG. 4. The sixteen bit Bank Mask (A_Mask$_{15}$-A_Mask$_0$) is logically ANDed on a bit-by-bit basis with the logical inversion of Bank Mask (B_Mask$_{15}$-B_Mask$_0$) by AND gates $224_{15}$-$224_0$. The sixteen bit Bank Mask (A-Mask$_{15}$-A_Mask$_0$) is also logically ANDed with an A_Priority bit by AND gates $226_{15}$-$226_0$. The A_Priority bit is generated by arbitration logic not shown and necessary for the understanding of the present invention. Suffice it to say that the assertion of the A_Priority bit denotes that Port_A is of highest priority in accessing the unified cache 60. The collective outputs of AND gates $224_{15}$-$224_0$ and AND gates $226_{15}$-$226_0$ are logically ORed together on a bit-by-bit basis by OR gates $228_{15}$-$228_0$ to form ASel$_{15}$-ASel$_0$. BSel$_{15}$-BSel$_0$ are similarly formed with the exception that Mask (A_Mask$_{15}$-A_Mask$_0$) is inverted rather than Mask (B_Mask$_{15}$-B_Mask$_0$) and the A_Priority bit is inverted before logically ANDing it with B_Mask$_{15}$-B_Mask$_0$ to form the second logical OR term.

Figure 7:
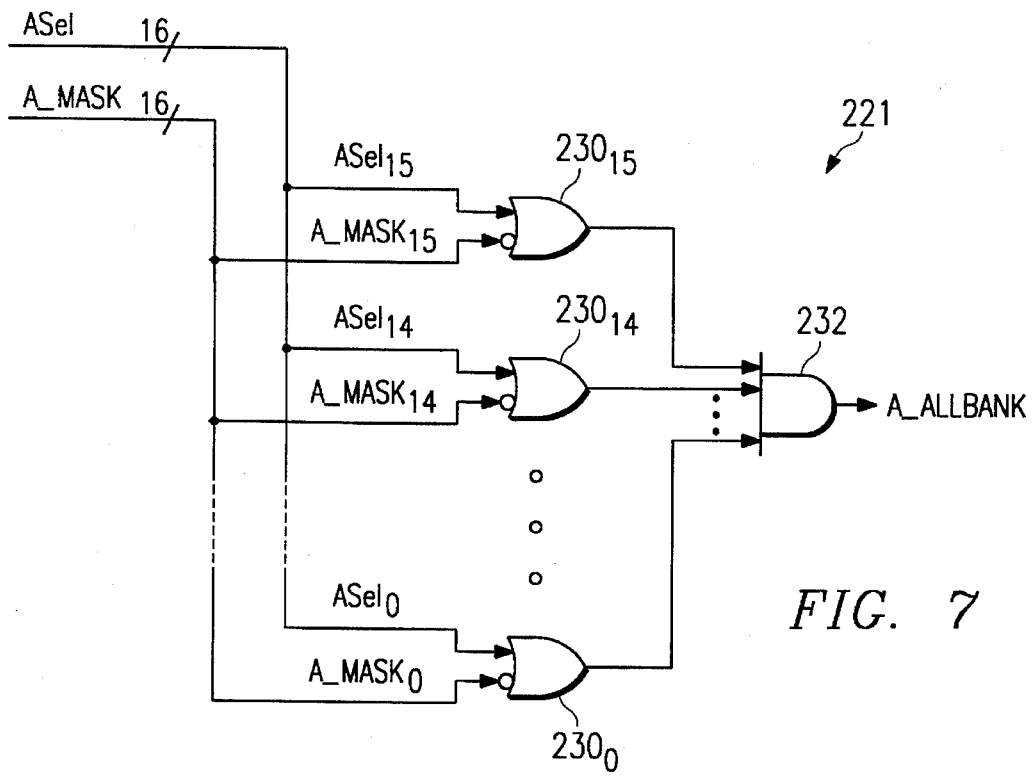
FIG. 7 illustrates the preferred embodiment for circuitry that detects all memory bank requests received embodied in the bank selection logic of FIG. 4; and, FIG. 8 illustrates a flow diagram of the bank selection logic depicted in FIG. 4.

Reference is now made to FIG. 7 which illustrates the preferred embodiment for the received all banks indication circuitry 221 embodied in the bank selection logic 202 depicted in FIG. 4. The A_ALLBANK output signal indicates that Port_A received all its required memory banks necessary for a particular Port_A read. If A_ALLBANK is not asserted the read attempt has failed and Port_A must resubmit its read request. The sixteen bit ASel$_{15}$-ASel$_0$ mask is bitwise logically ORed by OR gates $230_{15}$-$230_0$ with the logical inversion of A_Mask$_{15}$-A_Mask$_0$. The collective outputs of OR gates $230_{15}$-$230_0$ are logically ANDed together by multiple input AND gate 232 to form the A_ALLBANK signal. At this point it should be noted that while multiple input AND gate 232 may induce multiple gate delays due to implementation, it is of no consequence since the A_ALLBANK signal is not in the data path. Rather, the A_ALLBANK signal is in the control path and is used to signal Port_A to reissue a read request in the event of a conflict (i.e. A_ALLBANK is not true).

Likewise, the B_ALLBANK output signal indicates that Port_B received all its required memory banks needed for a particular Port_B read. The sixteen bit BSel$_{15}$-BSel$_0$ mask is bitwise logically ORed with the logical inversion of B_Mask$_{15}$-B_Mask$_0$ and the collective ORed outputs are logically ANDed together to form the B_ALLBANK signal.

Figure 8:
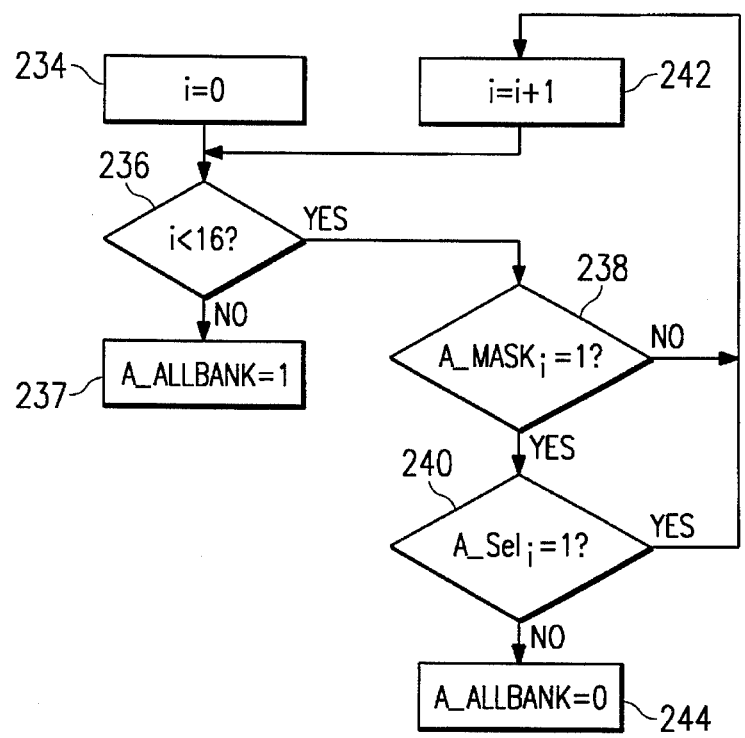

Reference is now made to FIG. 8 which illustrates a flow diagram of the bank selection logic 202 depicted in FIG. 4. While FIG. 8 represents the logic of bank selection logic 202, it does not necessarily represent the temporal relationship in which it is accomplished. More specifically, FIG. 8 illustrates sequential rather than parallel logic reduction wherein an index bit (i) illustrative of the bank number, is tested and incremented. At step 234 index (i) is set to zero. At decision step 236, index (i) is tested to see whether all (sixteen) banks have been tested. If so, and if no other condition indicates a conflict as discussed below, then at step 237, the A_ALLBANK (B_ALLBANK) signal is asserted true (1) indicating that Port_A (Port_B) received all its requested memory banks. If all (sixteen) banks have not been tested, then the next A_Mask (B_Mask) bit in the sequence of memory banks is tested at step 238 to see if Port_A (Port_B) needs that particular bank. If so, then ASel (BSel) for that bank is tested at step 240. If either the A_Mask (B_Mask) bit is not set or the ASel (BSel) is set, then control is passed to step 242 which increments the bank index (i). Control then repeats at step 236. If both the A_Mask (B_Mask) bit is asserted and the ASel (BSel) bit is not asserted, then A_ALLBANK (B_ALLBANK) is asserted false (0) at step 244.

4. Conclusion

Although the Detailed Description of the invention has been directed to certain exemplary embodiments, various modifications of these embodiments, as well as alternative embodiments, will be suggested to those skilled in the art. For example, specific register structures, mappings, bit assignments, cache associativity, degree of banking, and other implementation details are set forth solely for purposes of providing a detailed description of the invention. However, the invention has general applicability to any computer system employing shared interleaved memory. Various modifications based on tradeoffs between hardware and software logic will be apparent to those skilled in the art. Also, specific nomenclature is conventional for the x86 architecture and is used for the purpose of describing the exemplary embodiment only. The invention encompasses any modifications or alternative embodiments that fall within the scope of the claims.

What is claimed is:

1. A shared interleaved memory comprising:
   a) a plurality of memory banks each having an address input and at least one set of data outputs;
   b) a first plurality of multiplexers each having at least two address inputs and an address output respectively coupled to the plurality of memory banks;
   c) a second plurality of multiplexers each having an output and at least one set of data inputs coupled to the at least one set of data outputs on the plurality of memory banks;
   d) a plurality of concentrators each having an output and at least one set of data inputs coupled to the outputs of the plurality of the second multiplexers; and;
   e) bank selection circuitry, coupled to the first and second plurality of multiplexers, to resolve bank conflicts between the at least two address inputs and to signal a losing bank request if either of the at least two address inputs did not receive all requested banks, the bank selection circuitry including,
      (i) a mask generator having;
         a premask circuit having an input for receiving an operand size code and an output;
         a shifter having a first input coupled to the output of the premask circuit, a second input coupled to a plurality of address bits, and an output representative of the first input shifted N places wherein N is defined by the plurality of address bits; and,
         bank width logic circuitry have an input coupled to the output of the shifter and an output for generating a bank request mask;
      (ii) selection circuitry having inputs coupled to the bank request mask and an output for selecting banks; and,
      (iii) received all banks indication circuitry having inputs coupled to the mask generator and to the selection circuitry.

2. A shared interleaved memory as recited in claim 1 further comprising f) a plurality of aligners each having an output and an input coupled to respective outputs of the plurality of concentrators.

3. A shared interleaved memory comprising:
   a) memory bank means, having a plurality of N-way set associative banks, for storing data along predetermined address boundaries;
   b) first multiplexer means, having at least two address inputs, for addressing the memory bank means;
   c) second multiplexer means, coupled to the memory bank means, for selecting an output from each of the plurality of N-way set associative banks;
   d) concentrator means, coupled to the second multiplexer means, for concatenating data into wide chunks; and,
   e) bank selection means, coupled to the first and second multiplexer means, for resolving bank conflicts between the at least two address inputs and for signaling a losing bank request if either of the at least two address inputs did not receive all requested banks, the bank selection means including;
      (i) premask means for generating a premask in response to receiving an operand size code wherein the premask generating means further comprises:
         shifter means, coupled to the premask means and to a plurality of address bits, for generating an output representative of the premask shifted N places, wherein N is defined by the plurality of address bits; and,
         bank width logic means, coupled to the shifter means, for generating a bank request mask;
      (ii) selection means coupled to the premask generating means for selecting banks; and,
      (iii) indication means coupled to the premask generating means and the selection means, for indicating that all banks requested were received.

4. A shared interleaved memory as recited in claim 3 further comprising f) aligner means, coupled to the concentrator means, for aligning the wide chunks on selected boundaries.

* * * * *